United States Patent
Shigenobu

(10) Patent No.: US 9,026,690 B2
(45) Date of Patent: May 5, 2015

(54) DISPLAY DEVICE HAVING CONNECTION RECEIVING PORTION FOR EXTERNAL STORAGE DEVICE AND IMAGE FORMING APPARATUS HAVING DISPLAY PANEL

(71) Applicant: Kyocera Document Solutions Inc., Osaka (JP)

(72) Inventor: Dai Shigenobu, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 6 days.

(21) Appl. No.: 13/865,923

(22) Filed: Apr. 18, 2013

(65) Prior Publication Data
US 2013/0290576 A1    Oct. 31, 2013

(30) Foreign Application Priority Data
Apr. 26, 2012 (JP) ................. 2012-100792

(51) Int. Cl.
*G06F 13/10* (2006.01)
*H04N 1/00* (2006.01)

(52) U.S. Cl.
CPC ............... *G06F 13/10* (2013.01); *H04N 1/00* (2013.01); *H04N 1/0035* (2013.01)

(58) Field of Classification Search
CPC .................................................... G06F 3/0481
See application file for complete search history.

(56) References Cited

U.S. PATENT DOCUMENTS

| | | | |
|---|---|---|---|
| 6,473,811 B1 * | 10/2002 | Onsen .............................. | 710/15 |
| 6,993,618 B2 * | 1/2006 | Chen et al. .................... | 710/305 |
| 8,028,244 B2 * | 9/2011 | Takahashi et al. ............. | 715/772 |
| 8,077,206 B2 * | 12/2011 | Hijikata et al. ............. | 348/207.1 |
| 8,135,875 B2 * | 3/2012 | Ito .................................... | 710/15 |
| 8,291,335 B2 * | 10/2012 | Okamoto ....................... | 715/769 |
| 8,356,998 B2 * | 1/2013 | Tahara ............................. | 439/66 |
| 8,533,813 B2 * | 9/2013 | Machiyama .................... | 726/18 |
| 8,582,144 B2 * | 11/2013 | Tsujimoto .................... | 358/1.15 |

(Continued)

FOREIGN PATENT DOCUMENTS

| | | |
|---|---|---|
| JP | 2002222391 A | 8/2002 |
| JP | 2006180324 A | 7/2006 |

(Continued)

OTHER PUBLICATIONS

"Apple MacOS X Lion MacOS X Lion v10.7", Perfect Master, Jan. 1, 2012, 3 pages.

*Primary Examiner* — Ilwoo Park
(74) *Attorney, Agent, or Firm* — Alleman Hall McCoy Russell & Tuttle LLP

(57) ABSTRACT

A display device as in one aspect of the present disclosure includes a display panel, a case, a connection receiving portion, a connection determination portion, and a display processing portion. The display panel displays an image. The case supports a display surface of the display panel so as to be viewable from the exterior. The connection receiving portion is provided to a side surface of the case, and electrically connects to an external storage device. The connection determination portion determines whether or not the external storage device has been connected to the connection receiving portion. The display processing portion displays, on the display panel, a connection portion image indicative of a connection portion of the connected external storage device in a case where the external storage device has been determined by the connection determination portion to have been connected.

18 Claims, 9 Drawing Sheets

(56) References Cited

U.S. PATENT DOCUMENTS

| | | | |
|---|---|---|---|
| 8,627,027 B2* | 1/2014 | Nakajima | 711/162 |
| 2004/0032394 A1 | 2/2004 | Ayatsuka et al. | |
| 2005/0021881 A1* | 1/2005 | Asano et al. | 710/19 |
| 2008/0192285 A1 | 8/2008 | Cho | |
| 2008/0239359 A1* | 10/2008 | Kadota | 358/1.13 |
| 2009/0024769 A1 | 1/2009 | Nakatani et al. | |
| 2009/0180144 A1* | 7/2009 | Ito | 358/1.16 |
| 2011/0149341 A1* | 6/2011 | Ko | 358/1.15 |
| 2012/0216250 A1* | 8/2012 | Chigusa | 726/2 |

FOREIGN PATENT DOCUMENTS

| | | |
|---|---|---|
| JP | 2009134512 A | 6/2009 |
| KR | 20080074325 A | 8/2008 |
| WO | 02061674 A1 | 8/2002 |

\* cited by examiner

DISPLAY DEVICE HAVING CONNECTION RECEIVING PORTION FOR EXTERNAL STORAGE DEVICE AND IMAGE FORMING APPARATUS HAVING DISPLAY PANEL

INCORPORATION BY REFERENCE

This application is based upon and claims the benefit of priority from the corresponding Japanese Patent Application No. 2012-100792 filed on Apr. 26, 2012, the entire contents of which are incorporated herein by reference.

BACKGROUND

The present disclosure relates to a display device provided with a connection receiving portion to which an external storage device, such as a USB memory, is connected, and relates also to an image forming apparatus having a display panel.

An image forming apparatus capable of printing after directly reading out data from an external storage device such as a USB memory or a memory card without the involvement of a cumbersome task such as migrating data to a personal computer (hereinafter, "computer"), has been known in recent years. Such a method of printing is called direct printing. An image forming apparatus capable of direct printing is provided with a connection receiving portion to which the external storage device can be connected. The image forming apparatus reads out data directly from the external storage device connected to the connection receiving portion. The image forming apparatus capable of direct printing is also provided with a display panel capable of displaying an image. The image forming apparatus is able to cause the display panel to display a preview image of the image data or text data that has been read out from the external storage device, before the printing is executed. This makes it possible for a user, in the process of executing a direct print, to select an image intended to be printed, crop the image, or check the image to be printed, while also consulting the preview image displayed on the display panel.

The image forming apparatus capable of direct printing also displays, on the display panel, an operation guidance, such as guide information indicative of the correspondence relationship between the external storage device and the connection receiving portion or guide information indicative of the connection method or connection position for the external storage device, so as to enable the user to connect external storage devices of a variety of different standards, such as an SD memory card, Memory Stick (registered trademark), CompactFlash (registered trademark), SmartMedia (registered trademark), or USB memory.

SUMMARY

A display device as in one aspect of the present disclosure includes a display panel, a case, a connection receiving portion, a connection determination portion, and a display processing portion. The display panel displays an image. The case supports a display surface of the display panel so as to be viewable from the exterior. The connection receiving portion is provided to a side surface of the case, and electrically connects to an external storage device. The connection determination portion determines whether or not the external storage device has been connected to the connection receiving portion. The display processing portion displays, on the display panel, a connection portion image indicative of a connection portion of the connected external storage device in a case where the external storage device has been determined by the connection determination portion to have been connected.

An image forming apparatus as in another aspect of the present disclosure includes a display panel, a case, a connection receiving portion, a connection determination portion, and a display processing portion. The display panel displays an image. The case supports a display surface of the display panel so as to be viewable from the exterior. The connection receiving portion is provided to a side surface of the case, and electrically connects to an external storage device. The connection determination portion determines whether or not the external storage device has been connected to the connection receiving portion. The display processing portion displays, on the display panel, a connection portion image indicative of a connection portion of the connected external storage device in a case where the external storage device has been determined by the connection determination portion to have been connected.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an operation display device (one example of a display device of the present disclosure) as in an embodiment of the present disclosure, as well as an image forming apparatus 10 provided with the same (one example of an image forming apparatus of the present disclosure), with reference to the accompanying drawing as appropriate. The embodiment described below is merely one example embodying the present disclosure, and the embodiment of the present disclosure can be modified as appropriate within a scope not departing from the essence of the present disclosure.

Figure 1:
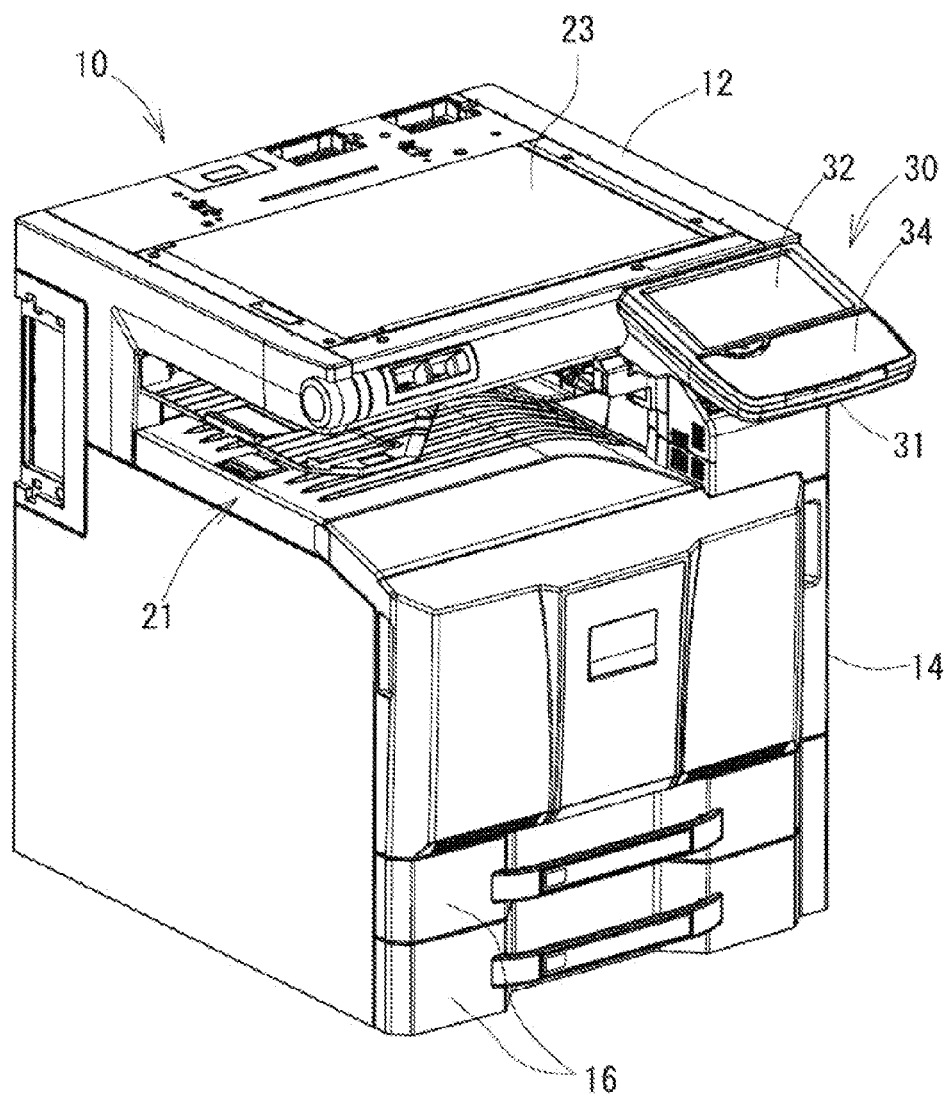
FIG. 1 is a perspective view illustrating a schematic configuration of an image forming apparatus as in an embodiment of the present disclosure.

As illustrated in FIG. 1, the image forming apparatus 10 is a so-called internal paper feed type, and is a multifunction peripheral provided with such functions as a printer function, a scanner function, a copier function, and a facsimile function. The image forming apparatus 10 uses a print material, such as a toner, for monochrome printing or color printing of an inputted image onto print paper. The image forming apparatus 10 is not limited to a multifunction peripheral; the present disclosure can also be applied to a dedicated apparatus such as a printer or a copier.

The image forming apparatus 10 is provided at the top with a scanner 12 for reading in an image of a document, and is provided at the bottom with an electrophotographic image forming portion 14. The image forming portion 14 is not limited to electrophotographic, and may instead be of an inkjet recording system, or may be any other recording system or printing system.

As illustrated in FIG. 1, the scanner 12 is provided with a document loading surface 23. In a case where the image forming apparatus 10 functions as a copier, a read operation by the scanner 12 is initiated when copy start command is inputted from the operation display device 30 after a document has been placed at the document loading surface 23. Image data of the document is thereby read. FIG. 1 omits a depiction of a document cover for the scanner 12.

Figure 4A:
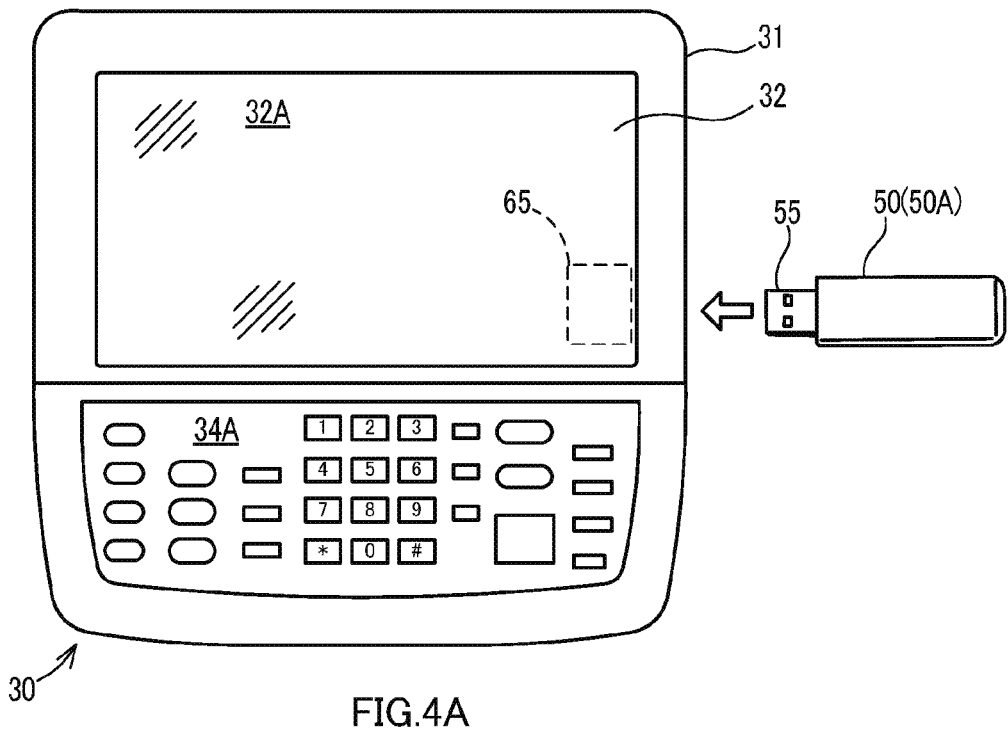
FIG. 4A is a schematic view for describing display content of a display surface of an operation display device as in an embodiment of the present disclosure.
Figure 5A:
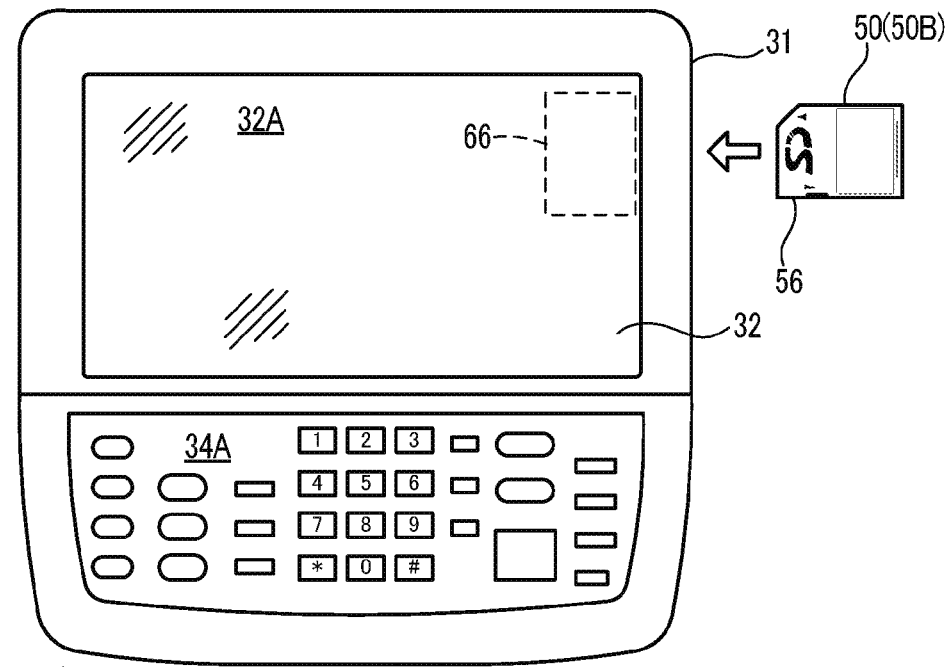
FIG. 5A is a schematic view for describing display content of a display surface of an operation display device as in an embodiment of the present disclosure.

The image forming portion 14 forms a monochrome image or color image on print paper of a defined size, such as the A series of sizes (for example, size A5,size A4,size A3) or the B series of sizes (for example, size B5 or size B4), on the basis of the image data read by the scanner 12 or of image data or text data that has been inputted from the exterior. The image forming portion 14 can also form a monochrome image or color image on print paper on the basis of image data or text data that has been read out directly from a USB memory 50A (see FIG. 4A), an SD memory card 50B (see FIG. 5A), or other form of external memory 50 (one example of an external storage device of the present disclosure) connected to the operation display device 30. In other words, the image forming portion 14 can also carry out a so-called direct print.

Provided to the bottom of the image forming portion 14 are two paper feed trays 16 able to hold a plurality of sheets of print paper. Provided to the interior of the image forming portion 14 are a transfer device, a fixation device, a discharge portion, and the like (not shown). When print paper is fed from the paper feed trays 16 to the transfer device, the transfer device transfers a toner image onto the fed print paper. Thereafter, the fixation device fixes the toner image to the print paper. The print paper, after fixation, is then discharged by the discharge portion to a paper discharge space 21 provided to an upper side of the image forming portion 14.

The operation display device 30 is provided to the right end of the front side of the scanner 12. The operation display device 30 is provided with a display panel 32 (see FIG. 2A), an operation portion 34 (see FIG. 2A), and a control portion 36 (see FIG. 3). The display panel 32 and the operation portion 34 are held within a case 31 (one example of a case of the present disclosure) of the operation display device 30.

Figure 2:
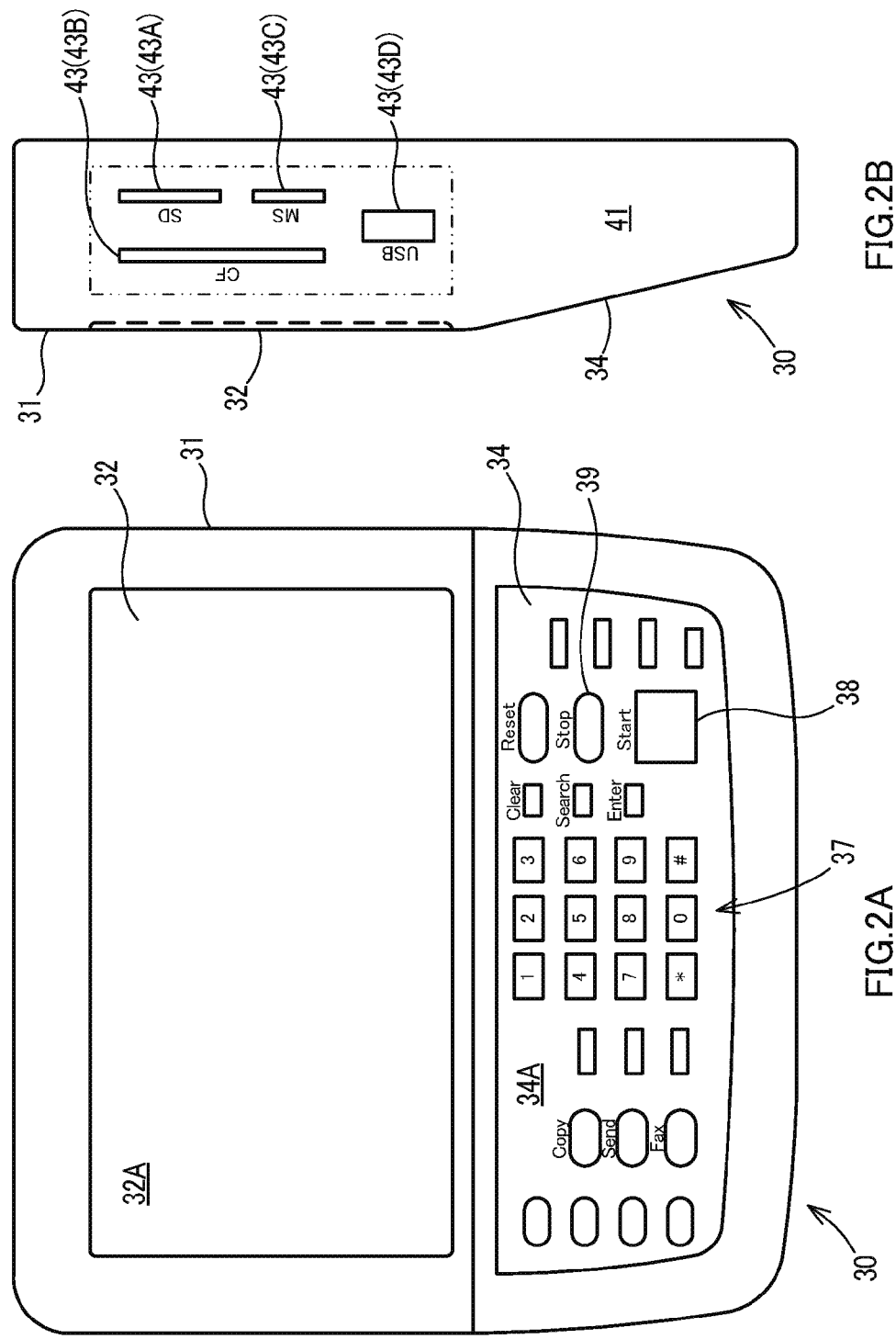
FIG. 2A is a schematic view illustrating a configuration of an operation display device as in an embodiment of the present disclosure.
FIG. 2B is a schematic view illustrating a configuration of an operation display device as in an embodiment of the present disclosure.

As illustrated in FIG. 2A, the display panel 32 is provided to an upper side (back side) of the operation display device 30. The display panel 32 is supported by the case 31 so that a display surface 32A thereof can be viewed by a user from the exterior. The display panel 32 displays information that relates to printing (a plurality of key images for input, settings, commands, and the like; a preview image of the image data or text data to be printed; a message indicative of the print status; or the like), by using liquid crystal. As will be described below, the display panel 32 also displays an image (hereinafter also "connector image") of a connector, which is a connection portion of the external memory 50 (see FIG. 3) connected to the operation display device 30. The display panel 32 is a touch panel capable of detecting input by touch contact from the exterior, and, when a user touches a finger to contact the display surface 32A of the display panel 32, is capable of thereby accepting an input with respect to a displayed key image, the connector image, or the like.

As illustrated in FIG. 2A, the operation portion 34 is provided to a bottom side (front side) of the operation display device 30. Arranged on an upper surface 34A of the operation portion 34 are input keys, such as: numeric keys 37 for inputting numbers 0 to 9 and the like; a start button 38 for starting up a print operation, software, or the like; and a stop button 39 for stopping a print operation or the like.

Figure 3:
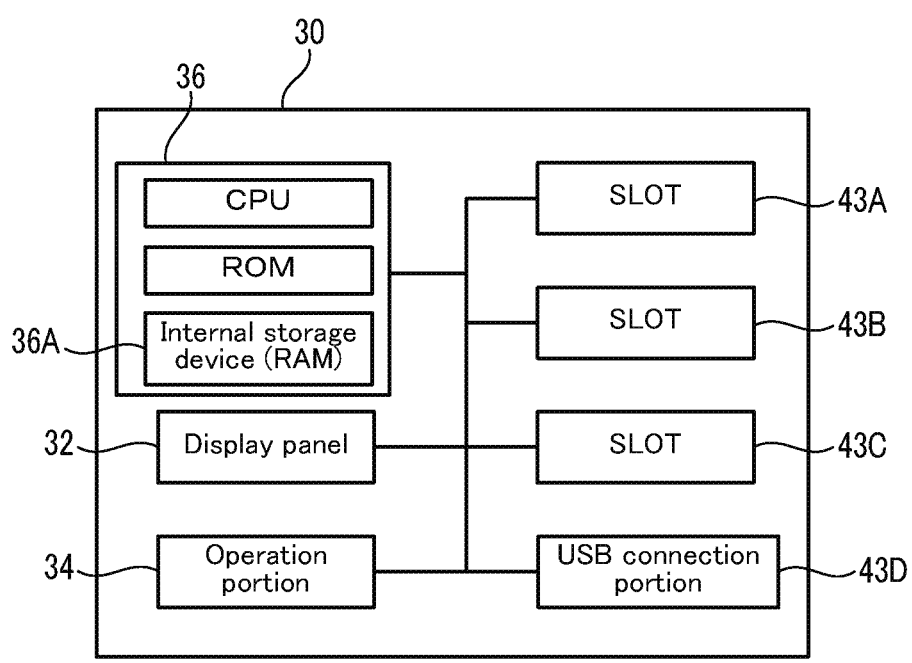
FIG. 3 is a block diagram illustrating a configuration of an operation display device as in an embodiment of the present disclosure.
Figure 7B:
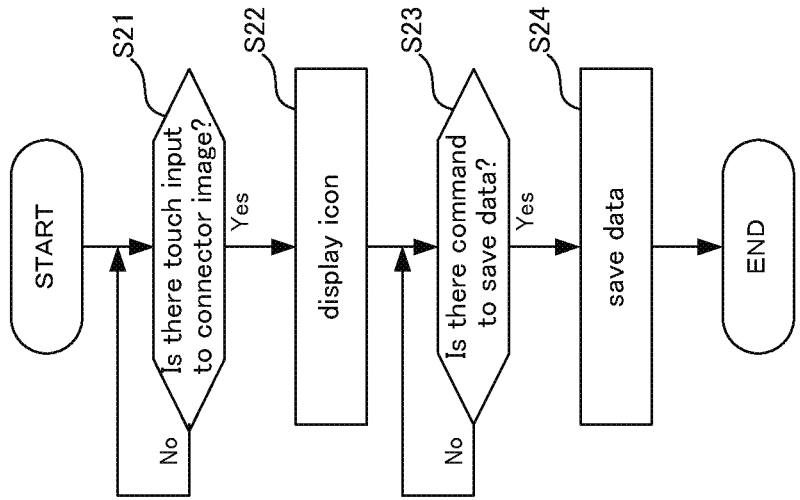
FIG. 7B is a flowchart for describing one example of procedures for a connection status display process and a data save process executed by a control portion of an operation display device as in an embodiment of the present disclosure.
Figure 7A:
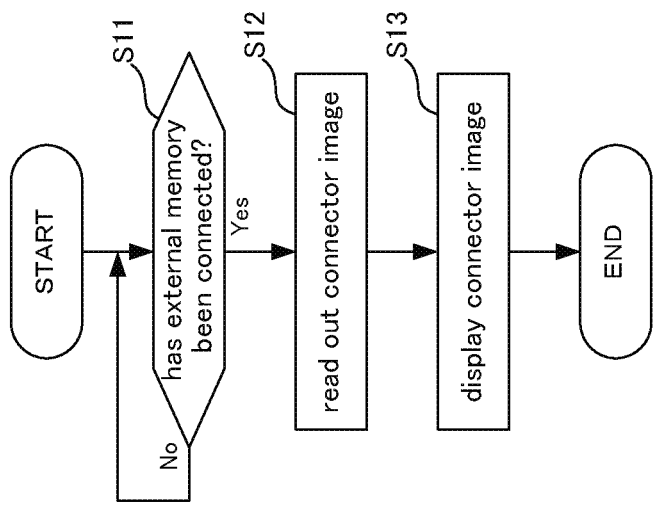
FIG. 7A is a flowchart for describing one example of procedures for a connection status display process and a data save process executed by a control portion of an operation display device as in an embodiment of the present disclosure.
Figure 9:
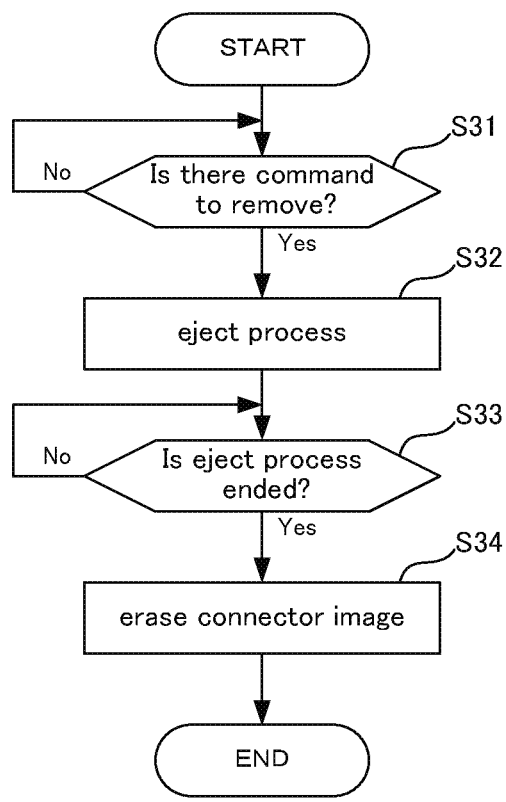
FIG. 9 is a flowchart for describing one example of a procedure for an eject process executed by a control portion of an operation display device as in an embodiment of the preset disclosure.

As illustrated in FIG. 3, the operation display device 30 is provided with the control portion 36. The control portion 36 has a CPU, ROM, RAM, ASIC, or the like, and, when software housed in the ROM is executed, or when a process according to an integrated circuit in the ASIC is carried out, thereby causes a predetermined image to be displayed on the display panel 32. In other words, the control portion 36 controls the operation display device 30 so as to carry out operations in accordance with a command input from the operation portion 34. In the present embodiment, when the CPU of the control portion 36 reads and executes a software program housed in the ROM, a process according to the procedure illustrated by the flowcharts in FIGS. 7A, 7B and 9 is executed. The control portion 36 for executing such a process is an implementation of a connection determination portion, a display processing portion, a first input determination portion, a storage processing portion, a second input determination portion, and an erase processing portion of the present disclosure.

As illustrated in FIG. 2B, a plurality of connection receiving portions 43 (43A to 43D) to which the external memory 50 is electrically connected are provided to one side surface 41 (in the present embodiment, the right side surface of the paper plane in FIG. 2A) of the operation display device 30. The plurality of connection receiving portions 43 (43A to 43D) are portions to which external memories 50 of different standards are connected. In the present embodiment, a slot 43A into which the SD memory card 50B is inserted, a slot 43B into which a CompactFlash (registered trademark) is inserted, a slot 43C into which a Memory Stick (registered trademark) is inserted, and a USB connection portion 43D to which the USB memory 50A is connected are provided to the side surface 41. The external memories 50 inserted into the connection receiving portions 43 are each of different standards. For this reason, only the external memory 50 corresponding to the same connection receiving portion 43 can be connected thereto. When an external memory 50 is connected to a connection receiving portion 43, the connection receiving portion 43 and a contact portion of the external memory 50 are electrically connected together, and the control portion 36 thereby recognizes the external memory 50. Herein, the SD memory card 50B, the CompactFlash (registered trademark), and the Memory Stick (registered trademark) are all examples of the card-type memory card of the present disclosure.

Figure 4B:
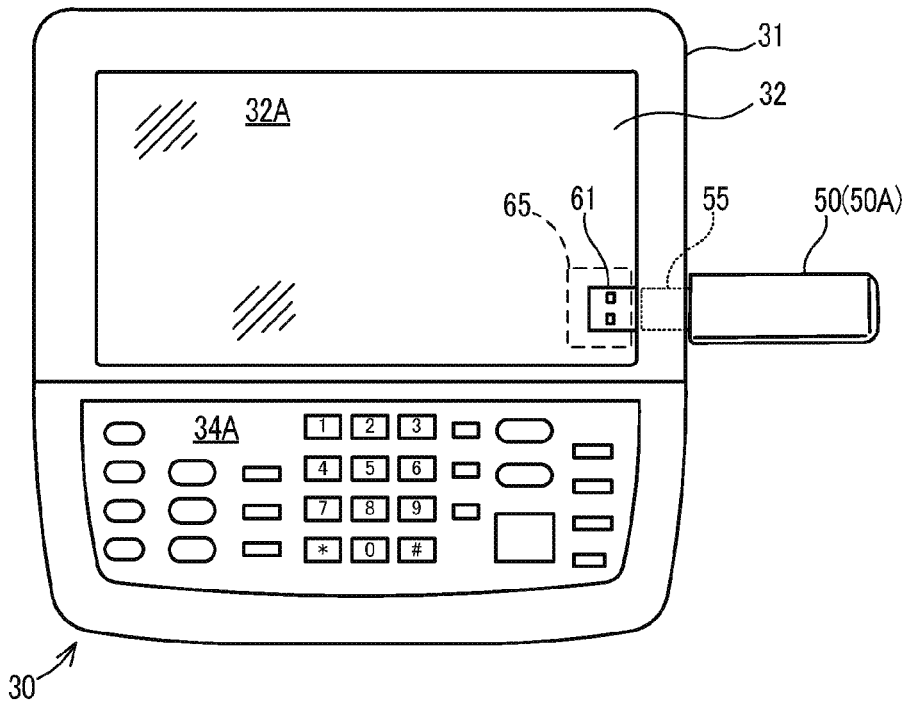
FIG. 4B is a schematic view for describing display content of a display surface of an operation display device as in an embodiment of the present disclosure.

In the present embodiment, as illustrated in FIG. 4B, when the USB memory 50A is connected to the USB connection portion 43D, a connector image 61 (connection portion image) indicative of a USB connector 55, which is a connection portion for the connected USB memory 50A, is displayed on the display surface 32A of the display panel 32 by the control portion 36.

More specifically, as illustrated in the flowchart in FIG. 7A, when the USB memory 50A is connected to the USB connection portion 43D, the control portion 36 determines whether or not the USB memory 50 has been connected to the USB connection portion 43D on the basis of whether or not there is an electrical connection between the USB connection portion 43D and the USB connector 55 (S11). Herein, when the control portion 36 checks the electrical connection and determines that the USB memory 50A has been connected to the USB connection portion 43D, the control portion 36 reads out the connector image 61 indicative of the USB connector 55 of the USB memory 50A from the ROM of the control portion 36 (S12). Thereafter, the control portion 36 displays the connector image 61 at a pre-established display position 65 on the display surface 32A (S13), as illustrated in FIG. 4B. The display position 65 is a position, on the display surface 32A of the display panel 32, that corresponds to the USB connection portion 43D to which the USB memory 50A is connected, and, as illustrated in FIG. 4B, is established at a position where an extension line of the direction of connection of the USB memory 50A and the right end of the display surface 32A intersect each other.

Figure 5B:
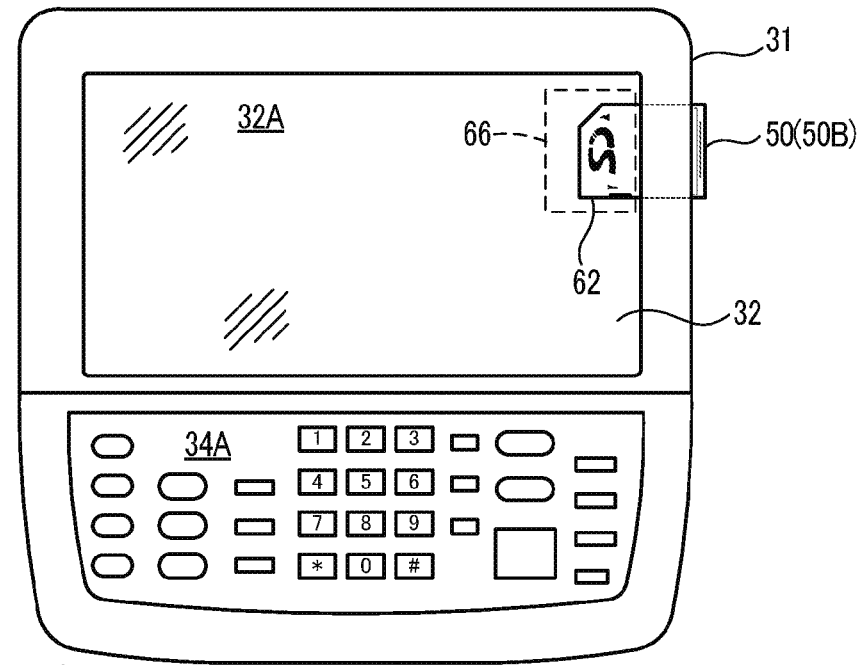
FIG. 5B is a schematic view for describing display content of a display surface of an operation display device as in an embodiment of the present disclosure.

As illustrated in FIG. 5B, in a case where the SD memory card 50B is inserted into the slot 43A, identically with respect to the case where the USB memory 50A is connected to the USB connection portion 43D, a connector image 62 (connection portion image) indicative of a connection portion 56, which has a connection terminal for the inserted SD memory card 50B, is displayed on the display surface 32A of the display panel 32 by the control portion 36. A display position 66 at which the connector image 62 is displayed at this time is a position, on the display surface 32A of the display panel 32, that corresponds to the slot 43A into which the SD memory card 50B has been inserted. The display position of the connector image 62, as illustrated in FIG. 5B, is established at a position where an extension line of the direction of insertion of the SD memory card 50B and the right end of the display surface 32A intersect each other. In a case where an external memory 50 is connected to the slot 43B or the slot 43C, too, identically with respect to the case where the USB memory 50A is connected to the USB connection portion 43D, a connector image for the external memory 50 is displayed at a position corresponding to the slot 43B or the slot 43C.

In this manner, in cases where the external memories 50 are connected respectively to the plurality of connection receiving portions 43 (43A to 43D) provided to the side surface 41 of the case 31, images for the connection portions, such as the connector image 61 or the connector image 62, are displayed at positions corresponding to each of the connection receiving portions 43 (43A to 43D). This allows the user to intuitively recognize the position of the external memory 50 that has been connected by the user, as well as to recognize that the external memory 50 has actually been correctly connected.

Figure 6A:
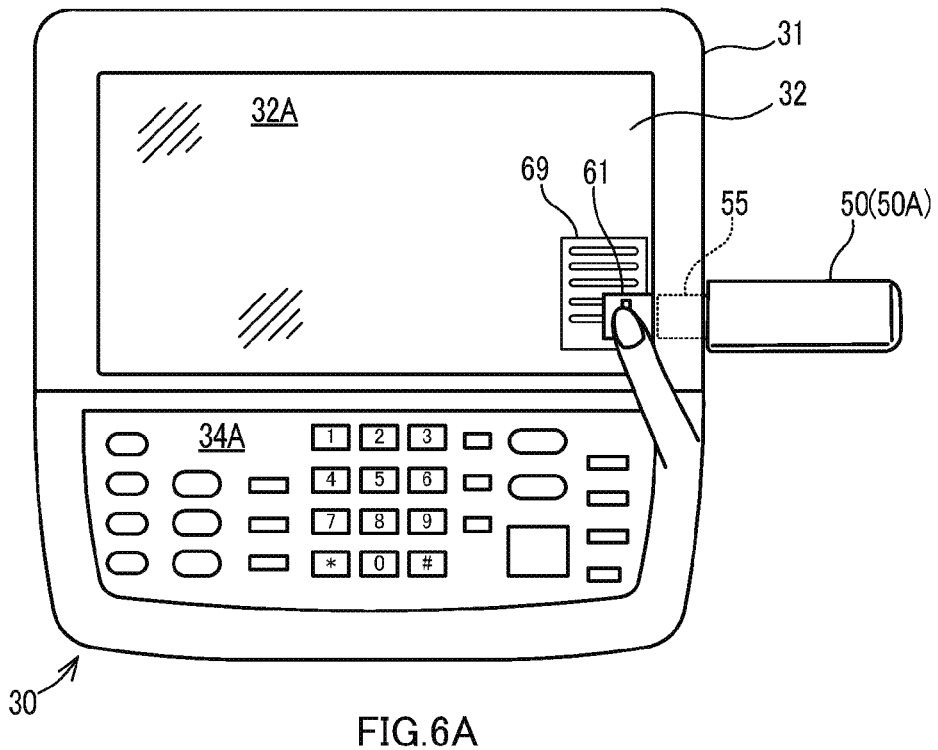
FIG. 6A is a schematic view for describing a method for a data save operation on a display surface of an operation display device as in an embodiment of the present disclosure.
Figure 6B:
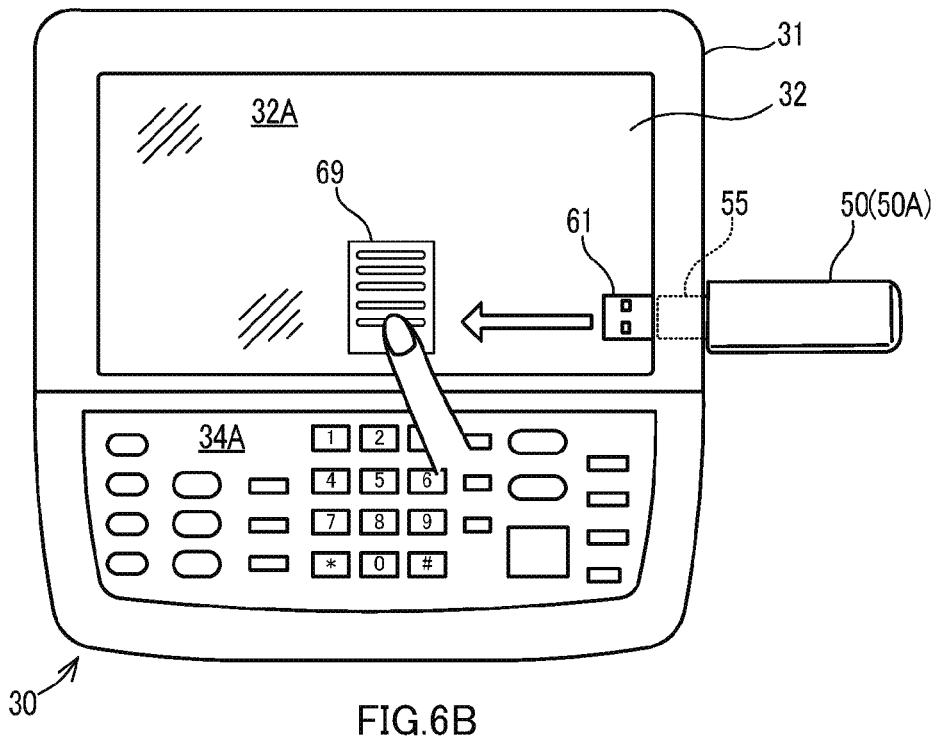
FIG. 6B is a schematic view for describing a method for a data save operation on a display surface of an operation display device as in an embodiment of the present disclosure.

In the present embodiment, as illustrated in FIG. 6A, when the user touches the connector image 61 for the USB memory 50A displayed on the display surface 32A with a finger, an icon 69 indicative of data stored in the USB memory 50A is displayed by the control portion 36. Then, when the user slides the finger in the same direction as the direction of connection of the USB memory 50A while still touching the finger to the connector image 61 so as to move the icon 69 on the display surface 32A, the data stored in the USB memory 50A is read out by the control portion 36. Thereafter, the data thus read is stored in an internal storage device 36A, such as a RAM, that is built into the control portion 36.

More specifically, as illustrated in the flowchart in FIG. 7B, when the user touches a finger to the connector image 61 being displayed on the display surface 32A, the control portion 36 determines that an external contact has made a touch input (equivalent to the first input of the present disclosure) with respect to the connector image 61 (S21). In a case where a touch input is determined to have been made, the control portion 36 reads out relevant information (for example, header information for the data) indicative of the content of the data stored in the USB memory 50A, reads out the icon 69 associated with the data in the USB memory 50A from the ROM of the control portion 36, and displays the same at the display position 65 (S22). At this time, the icon 69 is displayed on the rear side of the connector image 61. Next, the control portion 36 determines whether or not a command to save data has been inputted (S23). More specifically, when the user slides the finger in the same direction as the direction of connection of the USB memory 50A (hereinafter, "the first direction") while still touching the finger to the connector image 61, the control portion 36 determines that a continuous external input has been made in the first direction. In this case, the external input is recognized as a command to save data in the internal storage device 36A from the USB memory 50A. When the save command is determined to have been inputted, the control portion 36 moves, in the first direction, the icon 69 being displayed on the rear side of the connector image 61. The control portion 36 then reads out the data stored in the USB memory 50A and saves the same in the internal storage device 36A, such as a RAM, of the control portion 36 (S24). The control portion 36 also reads data from an external memory 50 and saves the same in the internal storage device 36A for the external memories 50 that are mounted onto the slots 43A to 43C, identically with respect to the case where data is read out from the USB memory 50A and saved.

This allows the user to store the data in the USB memory 50A into the internal storage device 36A merely by touching the connector image 61 and sliding in the first direction. As a result, with a single touch, data in the USB memory 50A can be easily stored in the internal storage device 36A without the need for user's cumbersome operation such as executing a plurality of operations in sequential order. The present disclosure may also be such that the control portion 36 stores the data in the USB memory 50A into the internal storage device 36A merely when the connector image 61 is touched for input. In a configuration in which, for example, the control portion 36 causes the display surface 32A to display an icon indicative of image data stored in an image data deposit portion (not shown) inside the image forming portion 14 when the user selects the image data, the control portion 36 may read out the image data from the image data deposit portion when the icon is moved by the user to the position of the connector image 61, and store the image data in the USB memory 50A. This makes it possible for the image data of the image data deposit portion to be easily stored in the USB memory 50A without the need for user's cumbersome operation such as carrying out a plurality of operations in sequential order.

In the present embodiment, it would also be possible to easily save, into the USB memory 50A, image data stored in an image data deposit portion (not shown), such as an HDD, provided to the image forming portion 14. Examples of such types of image data include image data of a document read by the scanner 12, image data previously read out from an external memory 50 and saved, image data saved in the image data deposit portion externally via a wired or wireless connection, or the like. More specifically, when the user operates the operation portion 34 and selects the image data housed in the image data deposit portion, an icon indicative of the image data is displayed on the display surface 32A. Then, when the user slides the finger to the position of the connector image 61 while still touching the finger to the icon so as to move the icon on the display surface 32A, the icon moves to the position of the connector image 61. The control portion 36 recognizes such an external input as a command to save data onto the USB memory 50A from the image data deposit portion. In a case where such an external input has been made, the control portion 36 reads out the image data from the image data deposit portion and stores the image data in the USB memory 50A, in a procedure inverse to the procedure for saving data onto the internal storage device 36A from the USB memory 50A.

Figure 8A:
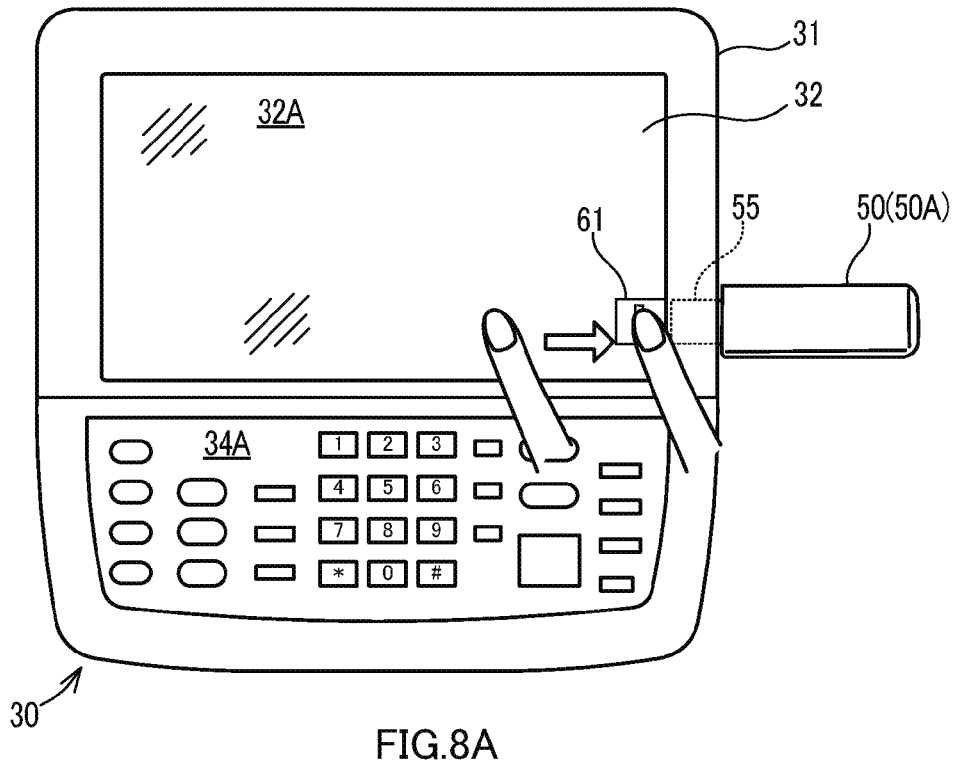
FIG. 8A is a schematic view for describing an operation method on a display surface of an operation display device as in an embodiment of the present disclosure.
Figure 8B:
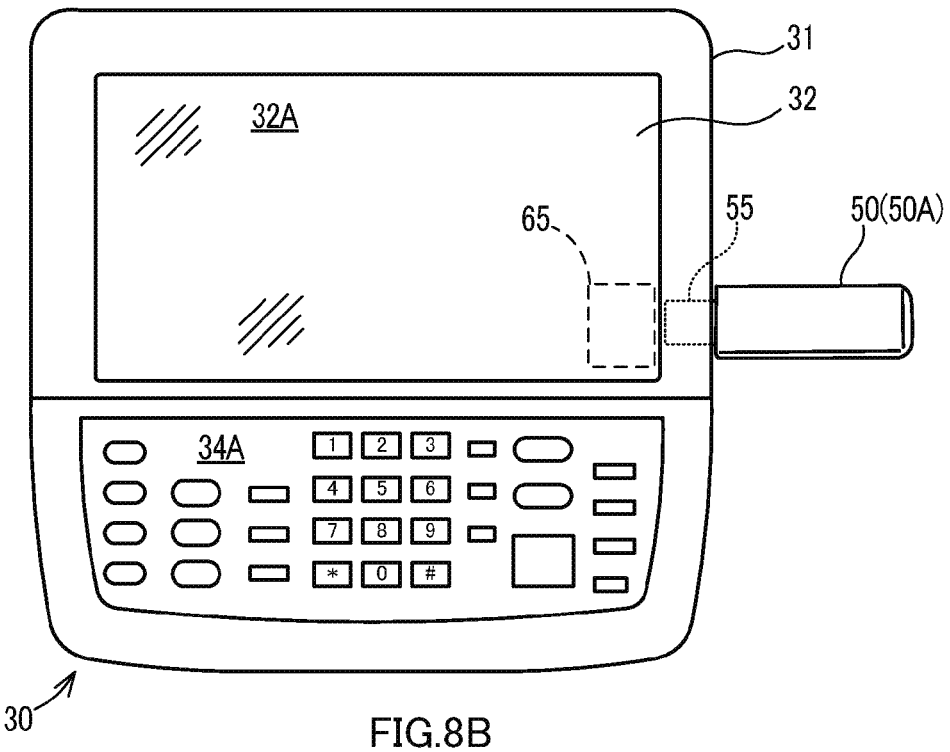
FIG. 8B is a schematic view for describing an operation method on a display surface of an operation display device as in an embodiment of the present disclosure.

In the present embodiment, as illustrated in FIGS. 8A, 8B, in a case where a continuous external input has been made in one direction in the vicinity of the connector image 61 of the USB memory 50A displayed on the display surface 32A, then the control portion 36 erases the connector image 61 from the display surface 32A after the USB memory 50A enters a removable state.

More specifically, the control portion 36 determines whether or not a command to remove the USB memory 50A has been inputted, as illustrated in the flowchart in FIG. 9 (S31). More specifically, when the user slides a finger toward the connector image 61 (toward the right) while still touching the finger to a region further to the left than the connector image 61 of the display surface 32A, the control portion 36 determines that a continuous external input in a direction inverse to the direction of connection of the USB memory 50A (hereinafter, the "second direction") (equivalent to the second input of the present disclosure) has been made. The control portion 36 recognizes the external input as a command to remove the USB memory 50A. When a remove command is determined to have been inputted, the control portion 36 stops processes on the USB memory 50A and executes an eject process for placing the USB memory 50A into a removable state (S32). Thereafter, when the eject process is complete (S33), the control portion 36 erases the connector image 61 that had been displayed on the display surface 32A (S34).

This allows the user to place the USB memory 50A in a removable state, merely by executing the simple operation of sliding the finger in the second direction. Moreover, the erasure of the connector image 61 allows the user to easily recognize, in a sensory manner through vision, that the USB memory 50A is now in a removable state.

Because the operation display device 30 is thus configured, when the USB memory 50A is connected to the USB connection portion 43D provided to the side surface 41 of the case 31 of the operation display device 30, the connector image 61 indicative of the USB connector 55 of the USB memory 50A is displayed at the display position 65 of the display surface 32A. It shall be readily understood that the connector image 61 is not displayed in a case where the USB memory 50A is not properly connected to the USB connection portion 43D. For this reason, even with a user not familiar with the connection operation for the USB memory 50A, the user can visually recognize whether or not the connector image 61 is being displayed on the display surface 32A. The user can also easily recognize that the USB memory 50A has actually been properly connected to the USB connection portion 43D, or that the USB memory 50A is not connected to the USB connection portion 43D. In this manner, the user can easily ascertain that the USB memory 50A has actually been connected merely by checking the connector image 61 displayed on the display surface 32A, without the need to carry out an operation following a plurality of cumbersome procedures. Also, because the user is notified of the connection status of the USB memory 50A merely by the connector image 61, there is no longer a need to prepare guidance comprising multilingual text, as in the prior art. It is also possible to eliminate the cumbersome operation of setting a guidance language for every country in which the image forming apparatus 10 is used.

In the embodiment described above, the icon 69 was displayed in a case where a touch input was applied to the connector image 61, but in a case where, for example, a plurality of sets of data are stored in the USB memory 50A, then when a touch input has been applied to the connector image 61, directory information on the data sets stored in the USB memory 50A may be displayed instead of the icon 69, and when a touch input is applied to one of the data sets in the directory information, an icon 69 associated with the data may be displayed. This makes it possible for only a data set selected from among a plurality of data sets to be read out from the USB memory 50A and stored in the internal storage device 36A.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display device, comprising:
a display panel that displays an image;
a case that supports a display surface of the display panel so as to be visible from the exterior;
a plurality of connection receiving portions that are used to electrically connect to a plurality of types of external storage devices and respectively correspond to the plurality of types of external storage devices, the plurality of connection receiving portions being provided to a side surface of the case;
a connection determination portion that determines whether or not the external storage device has been connected to the connection receiving portion;

a storage portion storing a plurality of connector images, which are images of respective connectors of the plurality of types of external storage devices; and a display processing portion that, when the external storage device has been determined by the connection determination portion to be connected to the display device, displays a connector image, which is an image of the connector of the connected external storage device, on the display panel at a pre-established display position on the display panel that corresponds to the connection receiving portion to which the connector of the connected external storage device is connected, the image of the connector being displayed until the external storage device enters a removable state, the display position being a position where an extension line of a direction of connection of the external storage device and the display panel intersect each other.

2. The display device according to claim 1, wherein:
the display panel is a touch panel capable of detecting an input by an external contact;
and the display device is further provided with: a first input determination portion that determines whether or not a predetermined first input by external contact has been made at the display position of the connector image on the display panel;
an internal storage device provided to the interior of the display device; and
a storage processing portion that reads out and stores, in the internal storage device, data stored in the external storage device in a case where the first input has been determined by the first input determination portion to have been made.

3. The display device according to claim 2, wherein the external storage device is a USB memory having a USB connector, or is a card-type memory card.

4. The display device according to claim 1, wherein:
the display panel is a touch panel capable of detecting an input by an external contact;
and the display device is further provided with: a second input determination portion that determines whether or not a second input by continuous external contact has been made in one direction in the vicinity of a display position of the connector image on the display panel; and
an erase processing portion that erases the connector image from the display panel after the external storage device has been placed in a removable state in a case where the second input has been determined by the second input determination portion to have been made.

5. The display device according to claim 4, wherein the external storage device is a USB memory having a USB connector, or is a card-type memory card.

6. The display device according to claim 1, wherein:
the display panel is a touch panel capable of detecting an input by an external contact;
and the display device is further provided with: a first input determination portion that determines whether or not a predetermined first input by external contact has been made at a display position of the connector image on the display panel;
an internal storage device provided to the interior of the display device; and
a storage processing portion that reads out and stores, in the internal storage device, data stored in the external storage device in a case where the first input has been determined by the first input determination portion to have been made.

7. The display device according to claim 6, wherein the external storage device is a USB memory having a USB connector, or is a card-type memory card.

8. The display device according to claim 1, wherein:
the display panel is a touch panel capable of detecting an input by an external contact;
and the display device is further provided with: a second input determination portion that determines whether or not a second input by continuous external contact has been made in one direction in the vicinity of a display position of the connector image on the display panel; and
an erase processing portion that erases the connector image from the display panel after the external storage device has been placed in a removable state in a case where the second input has been determined by the second input determination portion to have been made.

9. The display device according to claim 8, wherein the external storage device is a USB memory having a USB connector, or is a card-type memory card.

10. The display device according to claim 1, wherein the external storage device is a USB memory having a USB connector, or is a card-type memory card.

11. An image forming apparatus, comprising:
a display panel that displays an image;
a case that supports a display surface of the display panel so as to be visible from the exterior;
a plurality of connection receiving portions that are used to electrically connect to a plurality of types of external storage devices and respectively correspond to the plurality of types of external storage devices, the connection receiving portion being provided to a side surface of the case;
a connection determination portion that determines whether or not the external storage device has been connected to the connection receiving portion;
a storage portion storing a plurality of connector images, which are images of respective connectors of the plurality of types of external storage devices; and
a display processing portion that, when the external storage device has been determined by the connection determination portion to be connected to the display device, displays a connector image, which is an image of the connector of the connected external storage device, on the display panel at a pre-established display position on the display panel that corresponds to the connection receiving portion to which the connector of the connected external storage device is connected, the image of the connector being displayed until the external storage device enters a removable state, the display position being a position where an extension line of a direction of connection of the external storage device and the display panel intersect each other.

12. The image forming apparatus according to claim 11, wherein:
the display panel is a touch panel capable of detecting an input by an external contact;
and the display device is further provided with: a first input determination portion that determines whether or not a predetermined first input by external contact has been made at a display position of the connector image on the display panel;
an internal storage device provided to the interior of the display device; and
a storage processing portion that reads out and stores, in the internal storage device, data stored in the external storage device in a case where the first input has been determined by the first input determination portion to have been made.

13. The image forming apparatus according to claim 12, wherein the external storage device is a USB memory having a USB connector, or is a card-type memory card.

14. The image forming apparatus according to claim 11, wherein:
the display panel is a touch panel capable of detecting an input by an external contact;
and the display device is further provided with: a second input determination portion that determines whether or not a second input by continuous external contact has been made in one direction in the vicinity of a display position of the connector image on the display panel; and
an erase processing portion that erases the connector image from the display panel after the external storage device has been placed in a removable state in a case where the second input has been determined by the second input determination portion to have been made.

15. The image forming apparatus according to claim 14, wherein the external storage device is a USB memory having a USB connector, or is a card-type memory card.

16. The image forming apparatus according to claim 11, wherein
the display panel is a touch panel capable of detecting an input by an external contact;
and the display device is further provided with: a first input determination portion that determines whether or not a predetermined first input by external contact has been made at a display position of the connector image on the display panel;
an internal storage device provided to the interior of the display device; and
a storage processing portion that reads out and stores, in the internal storage device, data stored in the external storage device in a case where the first input has been determined by the first input determination portion to have been made.

17. The image forming apparatus according to claim 11, wherein
the display panel is a touch panel capable of detecting an input by an external contact;
and the display device is further provided with: a second input determination portion that determines whether or not a second input by continuous external contact has been made in one direction in the vicinity of a display position of the connector image on the display panel; and
an erase processing portion that erases the connector image from the display panel after the external storage device has been placed in a removable state in a case where the second input has been determined by the second input determination portion to have been made.

18. The image forming apparatus according to claim 11, wherein the external storage device is a USB memory having a USB connector, or is a card-type memory card.

* * * * *